United States Patent
Slater et al.

[15] 3,688,438
[45] Sept. 5, 1972

[54] PRODUCTION OF A METHANE-RICH SYNTHESIS GAS

[72] Inventors: William L. Slater; Warren G. Schlinger, both of c/o Texaco Inc., P.O. Box 400, Montebello, Calif. 90640

[22] Filed: Dec. 28, 1970

[21] Appl. No.: 102,129

[52] U.S. Cl. ..................48/215, 48/202, 252/373
[51] Int. Cl. .............................................C01b 2/14
[58] Field of Search........48/215, 214, 213, 212, 210, 48/197, 202; 252/373

[56] References Cited

UNITED STATES PATENTS

| | | | |
|---|---|---|---|
| 2,663,625 | 12/1953 | Born | 48/215 X |
| 2,809,104 | 10/1957 | Strasser et al. | 48/215 |
| 3,097,935 | 7/1963 | Steinhofer et al. | 48/215 |
| 3,468,641 | 9/1969 | Gross et al. | 48/215 X |
| 3,556,751 | 1/1971 | Slater et al. | 48/215 |

*Primary Examiner*—Morris O. Wolk
*Assistant Examiner*—R. E. Serwin
*Attorney*—Thomas H. Whaley and Carl G. Ries

[57] ABSTRACT

Methane-rich synthesis gas comprising $H_2$, CO, $CO_2$ and 10 to 26 percent by volume of $CH_4$ (dry basis) is produced by the partial oxidation of a hydrocarbonaceous fuel in a free flow noncatalytic synthesis gas generator at a reaction temperature below 1,700°F., a pressure in the range of about 15 to 250 atmospheres, and a steam of fuel weight ratio in the range of about 3 to 5. The product gas, after removal of $CO_2$ and $H_2S$ has a heating value in excess of 400 BTU/SCF.

5 Claims, No Drawings

PRODUCTION OF A METHANE-RICH SYNTHESIS GAS

BACKGROUND OF THE INVENTION

1. Field of the Invention

This invention relates to a process for the production of fuel gas or synthesis gas. More specifically the present invention relates to the production of methane-rich synthesis gas comprising $H_2$, CO and $CH_4$ by the partial oxidation of a hydrocarbonaceous fuel.

2. Description of the Prior Art

Gaseous mixtures substantially comprising $H_2$ and CO and containing minor amounts of impurities such as $CO_2$, $N_2$, $H_2S$, and $CH_4$ may be made by the partial oxidation of a liquid hydrocarbon fuel. In such processes, about 0.2 to 2 pounds of steam may be present in the reaction zone per pound of fuel oil. Further, the temperature in the reaction zone was maintained in the range of about 1,800° to 3,500°F. and preferably from 2,200° to 2,800°F. because it was believed that oxygen would not react properly with the hydrocarbon fuel at a temperature below about 1,800°F.

Prior art processes for increasing the amount of methane in the effluent gas by means of cracking hydrocarbon fuel at elevated temperature may be represented by general equation I, which follows. The amount of methane produced in such processes is a direct function of the temperature in the reaction zone. Accordingly, temperatures were kept above about 1,800°F.

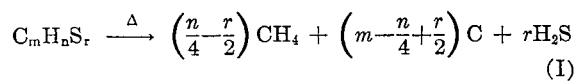

$$C_mH_nS_r \xrightarrow{\Delta} \left(\frac{n}{4}-\frac{r}{2}\right)CH_4 + \left(m-\frac{n}{4}+\frac{r}{2}\right)C + rH_2S \quad (I)$$

Further, to prevent the following undesirable endothermic methane consuming reaction as shown by Equation II, the ratio of $H_2O$ to fuel was kept below about 2.

$$CH_4 + H_2O \longrightarrow CO + 3H_2 \quad (II)$$

Gas mixtures made by such contemporary gasification processes may have a methane content in the range of about 0.5 to 2 mole percent and a maximum gross heating value of about 300 BTU per standard cubic foot (SCF). By applicants' process the heating values of synthesis gas have been considerably increased.

SUMMARY

Fuel gas substantially comprising $H_2$, CO, $CO_2$ and from about 10–26 volume percent of $CH_4$ was unexpectedly and unobviously produced by the partial oxidation of a hydrocarbonaceous fuel in the reaction zone of a free flow noncatalytic synthesis gas generator under the following unique conditions. The autogenous temperature in the reaction zone was maintained below 1,700°F. by holding the $H_2O$ to fuel weight ratio in the range of about 3–5 and the oxygen to carbon atomic ratio in the range of about 0.60–1.2.

The pressure in the reaction zone was 15 to 250 atmospheres. The product gas, after removal of $CO_2$ and $H_2S$ was found to have a gross heating value in excess of 400 BTU per standard cubic foot (SCF) and a minimum $H_2/CO$ ratio (mole/mole) of about 1.5.

It is therefore a principal object of the present invention to provide a continuous process for economically and efficiently producing a methane-rich gas having a high gross heating value and a high $H_2/CO$ mole ratio.

Another object of the invention is to produce a stream of fuel gas or synthesis gas having a comparatively high methane content and improved heating value.

DESCRIPTION OF THE INVENTION

The present invention involves an improved continuous process for the production of a gaseous mixture comprising carbon monoxide, hydrogen and methane suitable for use as a fuel gas. The product gas having a minimum mole ratio $H_2/CO$ of about 1.5 may also be used as a process gas for the synthesis of organic chemicals.

The term hydrocarbonaceous fuel as used herein is intended to mean such feedstocks as various petroleum distillates and residua, naphtha, gas oil, residual fuel, reduced crude, whole crude, coal tar oil, shale oil and tar sand oil. Also included are oil and water slurries of solid hydrocarbonaceous fuels e.g. coal and petroleum coke.

The hydrocarbonaceous fuel is introduced into a reaction zone of a free-flow noncatalytic synthesis gas generator along with oxygen and $H_2O$. The amount of each reactant is controlled so as to maintain an unusually low autogenous temperature in the range of about 1,200° to 1,700°F. The oxygen may be supplied in the form of an oxygen-rich gas, i.e. air, oxygen enriched air (22 mole percent $O_2$ and more), and preferably substantially pure oxygen (95 mole percent $O_2$ and more). The amount of oxygen is controlled so as to prevent complete oxidation of the fuel. The atomic ratio of free (uncombined) oxygen to carbon in the feed (O/C ratio) is maintained in the range of about 0.60 to 1.2, and preferably below 1.0. The $H2O$ may be supplied to the generator in liquid or gaseous phase. It will react with CO and hydrocarbon fuel and moderate the temperature in the reaction zone. The $H_2O$ may be introduced in admixture with the oxygen-rich gas or with the hydrocarbon fuel.

The synthesis gas generator is a cylindrical shaped vertically aligned steel pressure vessel whose inside walls are lined with refractory. An axially aligned flanged inlet port is located at the top of the vessel and a flanged outlet port is located at the bottom. The synthesis gas generator is free from packing or other obstructions to the flow of the gases therethrough. The various feedstreams may be introduced into the gas generator at ambient temperature, but preferably at a temperature in the range of about 100° to 800°F. An annulus type burner such as described in coassigned U.S. Pat. No. 2,928,460 issued to DuBois Eastman et al. mounted in the top flanged port may be employed to introduce the various feed streams into the synthesis gas generator.

Oxygen is mixed with the fuel mixture and steam in the reaction zone of the synthesis gas generator and reaction takes place at an unusually low autogenous temperature in the range of about 1,200° to 1,700°F. and with an unusually high $H_2O$ to hydrocarbon fuel ratio i.e., 3–5 parts by weight of $H_2O$ to 1 part by weight of fuel. By operating in this manner a stream of synthesis gas unexpectedly and unobviously issued from the gas generator which contained 10 to 26 percent methane by volume on a dry basis while containing an acceptable yield of soot (about 1 to 5 weight percent). Further, the mole ratio $H_2/CO$ was 3/1 or higher when the steam/fuel weight ratio was 4/1 or higher.

The carbon dioxide and hydrogen sulfide may be removed from the product gas by a suitable conventional process e.g. refrigeration, solvent absorption with mono or triethanolamine or hot carbonate, or a combination of said processes. Advantageously, $H_2S$, COS, and $CO_2$ may be readily removed from the product gas by means of the Rectisol and Purisol systems, as described in Industrial and Engineering Chemistry Vol. 62, No. 7, July, 1970 pp. 39–43. After removal of acid gases the methane content may be increased to about 40 mole percent.

The following example is offered as a better understanding of the present invention, but the invention is not to be construed as unnecessarily limited thereto.

EXAMPLE I

The process fuel oil in this example had a gravity of 16.9°API, a gross heating value of 18,585 BTU/lb., and the following analysis in weight percent: C 85.10, H 12.18, O 0.00, N 0.72, S 1.96, and ash 0.04. 240.7 pounds per hour of said process fuel oil at a temperature of about 229°F. were charged into the reaction zone of a noncatalytic free-flow unpacked synthesis gas generator. Substantially pure oxygen (99.5 mole percent of $O_2$ or higher) was preheated to a temperature of 100°F. and was supplied to said reaction zone at a rate of 2,729.5 standard cubic feet per hour (230.2 lbs/hr) in admixture with 852.6 pounds per hour of process steam at a temperature of 740°F. The resulting mixture of oil, steam and oxygen was reacted in a 2.14 cubic foot generator at an autogenous temperature of 1,690°F. and at a pressure of 2,200 psig.

9,538.2 standard cubic feet per hour of effluent gas was discharged from the reaction zone having the following analysis in mole percent (dry basis): carbon monoxide 13.73, hydrogen 34.57, methane 20.45, carbon dioxide 30.77, and hydrogen sulfide 0.30. In addition, about 4.03 weight percent of particulate carbon (basis carbon in the fuel) was present in the effluent gas.

The carbon dioxide and hydrogen sulfide may be removed from the effluent gas by means of the previously described Rectisol system. The resulting product gas which may be used as a fuel gas or synthesis gas has a gross heating value of about 528 BTU per standard cubic feet and comprises about 30 volume percent of methane.

The process of the invention has been described generally and by example with reference to materials of particular compositions for purposes of clarity and illustration only. It will be apparent to those skilled in the art from the foregoing that various modifications of the process and materials disclosed herein can be made without departure from the spirit of the invention.

We claim:

1. In a process for the production of fuel gas or synthesis gas by the partial oxidation of a hydrocarbonaceous fuel with an oxygen-rich gas and $H_2O$ in the reaction zone of a noncatalytic, free-flow synthesis gas generator the improvement comprising, introducing the charge into said reaction zone at a weight ratio of $H_2O$ to fuel in the range of about 3–5 to 1 and an atomic ratio of free oxygen to carbon (O/C ratio in the range of about 0.60 to 1.2, and reacting said materials by partial oxidation in said reaction zone at an autogenous temperature in the range of about 1,200° to 1,700°F. and at a pressure up to about 250 atmospheres, wherein the effluent gas mixture from the reaction zone principally comprises hydrogen, carbon oxides and a minimum of about 10 volume percent of methane on a dry basis.

2. The process of claim 1 wherein said hydrocarbonaceous fuel is a liquid hydrocarbon selected from the group consisting of petroleum distillate and residua, naphtha, gas oil, residual fuel, reduced crude, whole crude tar oil, shale oil and tar sand oil.

3. The process of claim 1 wherein said O/C ratio is less than 1.0 and with the added step of removing acid gases from said effluent gas to produce a fuel gas having a minimum molecular ratio $H_2/CO$ of 1.5 and a gross heating value of at least 400 BTU per standard cubic foot.

4. The process of claim 1 wherein said hydrocarbonaceous fuel is a slurry of solid hydrocarbonaceous fuel in a liquid selected from the group consisting of oil and water.

5. The process of claim 4 wherein said hydrocarbonaceous fuel is selected from the group consisting of coal and petroleum coke.

* * * * *

PO-1050
(5/69)

UNITED STATES PATENT OFFICE
CERTIFICATE OF CORRECTION

Patent No. 3,688,438              Dated September 5, 1972

Inventor(s) WILLIAM L. SLATER and WARREN G. SCHLINGER

It is certified that error appears in the above-identified patent and that said Letters Patent are hereby corrected as shown below:

| | |
|---|---|
| Title Page - Column 1, line 8 | Insert --/73_7 Assignee Texaco Inc. New York, New York-- |
| Title Page - In the ABSTRACT line 7 | After "steam" change "of" to --to-- |
| Column 2, line 40 | Change "H2O" to --$H_2O$-- |
| Column 4, line 21 | After "ratio" insert a closing bracket --)-- |

Signed and sealed this 17th day of April 1973.

(SEAL)
Attest:

EDWARD M. FLETCHER, JR.
Attesting Officer

ROBERT GOTTSCHALK
Commissioner of Patents